United States Patent [19]

Stroezel

[11] 3,978,385
[45] Aug. 31, 1976

[54] ELECTRIC POWER TOOL WITH TORQUE-DEPENDENT SPEED REGULATION

[75] Inventor: Reinhold Stroezel, Leinfelden-Oberaichen, Germany

[73] Assignee: Robert Bosch G.m.b.H., Stuttgart, Germany

[22] Filed: Oct. 24, 1974

[21] Appl. No.: 517,829

[30] Foreign Application Priority Data
Nov. 14, 1973 Germany............................ 2356797

[52] U.S. Cl................................ 318/337; 318/434
[51] Int. Cl.²....................................... H02P 7/28
[58] Field of Search ........... 318/332, 430, 434, 337

[56] References Cited
UNITED STATES PATENTS

| | | |
|---|---|---|
| 1,194,645 | 8/1916 | Lincoln............................ 318/337 X |
| 2,431,316 | 11/1947 | Dudley et al. ...................... 318/434 |
| 2,526,373 | 10/1950 | LeClair............................. 318/434 |
| 2,724,081 | 11/1955 | LaSource........................ 318/332 X |
| 3,564,372 | 2/1971 | Vogelsberg et al. ............. 318/434 X |

*Primary Examiner*—B. Dobeck
*Attorney, Agent, or Firm*—Michael J. Striker

[57] ABSTRACT

An electric motor of the tool has a drive shaft and in turn drives an output shaft by means of a gear transmission. A mechanical arrangement senses the torque of the drive shaft of the motor and varies the supply of electrical energy to the motor in dependence upon changes in the torque.

13 Claims, 1 Drawing Figure

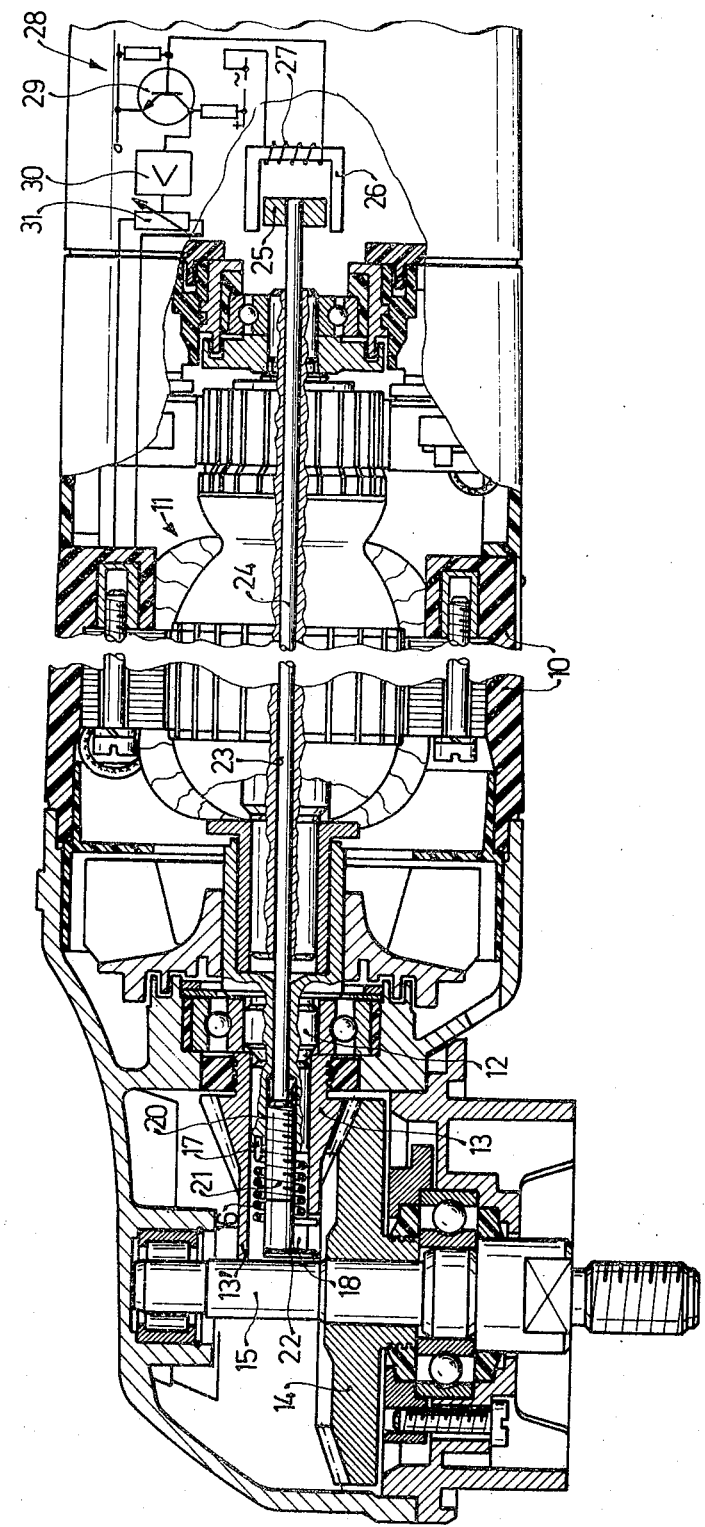

ELECTRIC POWER TOOL WITH TORQUE-DEPENDENT SPEED REGULATION

BACKGROUND OF THE INVENTION

The present invention relates generally to an electric power tool, and more particularly to an electric power tool with torque-dependent speed regulation.

There are various reasons, well known to those conversant with this art, why it is in many instances desirable to be able to obtain an automatic regulation of the speed of an electric motor in a power tool in dependence upon torque of the output shaft of the tool. Tools having torque-dependent speed regulation to meet the above requirement, are already well known in the art. However, in every instance of such prior-art tools the regulation of the motor speed in dependence upon the torque is carried out by a highly complicated electronic regulator. Evidently, complicated electronic equipment of this type is expensive and as a result the overall cost of the tool is similarly high. Moreover, such electronic equipment is sensitive and this, in combination with its complexity, has a disadvantageous effect upon the operational reliability of a tool provided with such an electronic speed regulator.

SUMMARY OF THE INVENTION

Accordingly, it is an object of the present invention to overcome the disadvantages of the prior art.

More particularly, it is an object of the present invention to provide an improved electric power tool having torque-dependent speed regulation which is not possessed of these disadvantages.

In particular, it is an object of the invention to provide such an improved electric power tool wherein a torque-dependent speed regulation is achieved in a very simple and reliable manner.

A further object of the invention is to provide such a power tool wherein the torque-dependent speed regulation is achieved mechanically, rather than electronically.

In keeping with these objects, and with others which will become apparent hereafter, one feature of the invention resides in an electric power tool with torque-dependent speed regulation which, briefly stated, comprises an electric motor having a drive shaft, a driven output shaft, and transmission means for transmitting rotary motion from the drive shaft to the driven shaft. Mechanical means is provided which is responsive to changes in the torque of one of the shafts by varying the rotational speed of the electric motor.

The construction according to the present invention thus replaces the purely electronic torque-dependent speed regulation of the prior art devices with a simple electro-mechanical arrangement which makes it possible, inter alia, to select the motor speed at load so as to be the same as, greater than or smaller than the motor speed under no load conditions, depending upon the elasticity of a spring or the thread pitch of a bolt, both of which are components of the arrangement, as will be discussed subsequently. Moreover, in the arrangement according to the present invention a built-in safety factor exists inasmuch as no moment of torque will be transmitted in the event the aforementioned spring should break, therefore eliminating the possibility that the device might operate out of control.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a longitudinal section through those portions of a tool embodying the present invention, which are òf importance for an understanding of the invention.

DESCRIPTION OF THE PREFERRED EMBODIMENTS

Referring now in detail to the drawing it will be seen that the electric power tool illustrated therein has a housing 10 which in this embodiment is composed of a plurality of housing portions that are connected with one another in suitable manner. Located substantially at the center of the housing 10 is an electro-motor 11 of the type whose speed can be varied, that is increased or decreased. The electric-motor 11 has a driven shaft or output shaft 12 which is composed of a plurality of shaft portions and on which a gear 13 — in this embodiment configurated as a bevel pinion — is turnably mounted. The gear 13 meshes with a similarly bevelled gear 14 which is fixedly mounted on an output shaft or work spindle 15 that is journalled for rotation in the housing 10, so that an angle drive is obtained. It will be appreciated that the invention would also be applicable to an arrangement which does not have an angle drive and/or wherein the gears are not bevelled.

The pinion 13 is potentially freely turnable on the shaft 12, but is connected with the same by means of a helical spring 16 one end of which extends into and is secured in a recess or bore 17 formed at the left-hand axial end face of the shaft 12, whereas the other end of the spring 16 extends into and is secured in a longitudinal slot 18 formed in an extension 13' of the pinion 13. Thus, the pinion 13 is connected with the shaft 12 for rotation with the same, but has freedom of turning angularly with reference to the shaft 12 through a certain extent which is determined by the elasticity of the spring 16.

A tapped bore 20 is formed in the shaft 12, extending inwardly from the left-hand end of the same in the drawing, and a threaded bolt 21 is threaded into the tapped bore 20. The spring 16 surrounds the bolt 21 which latter extends outwardly beyond the end face of the shaft 12 by a significant amount and carries at its own end that is directed towards the spindle 15 a projection or pin 22 which extends into the same slot 18 into which one end of the spring 16 is hooked. This means that the bolt 21 turns with the pinion 13 and cannot turn relative to it, but does have freedom of axial displacement to a limited extent.

The shaft 12 is formed over its entire axial length with a bore 23 in which a rod 24 is slidably accommodated which is firmly connected with the bolt 21. It is advantageous if the rod 24 is of a synthetic plastic material, for instance nylon or the like, to facilitate its sliding since nylon has a low coefficient of friction. The rod 24 projects outwardly beyond the shaft 12 at its right-hand end, that is the end which is remote from the spindle 15, and there carries a metallic body 25 which is ring-shaped in this embodiment and is configurated of iron or is configurated of a permanently magnetic material. This ring 25 extends with clearance into the yoke 26 of an electrical winding or coil 27 which in turn is connected with a electronic control unit 28 which is very simple in its construction and well known in the art. The electronic control unit 28 comprises an output transistor 29, an amplifier 30 connected to the output of the transistor, and a potentiometer 37 which regulates the motor current. It is this control unit which in turn is connected with the motor 11 to vary the rotational speed of the same in dependence upon signals resulting from a coaction of the ring 25 and the spool 27 with its yoke 26.

In operation of the arrangement illustrated in the drawing, the torque of the motor 11 is transmitted via the shaft 12 and the spring 16 to the pinion 13. Since the pinion 13 meshes with the gear 14, the torque is transmitted to the latter and from the same to the output spindle 15. Depending upon the torque prevailing at any moment, the pinion 13 can turn angularly with reference to the driven shaft 12 to a greater or lesser degree, within a certain range, the degree being determined by the prevailing torque. This relative displacement of pinion 13 to shaft 12 causes an axial displacement of the bolt 21 with reference to the shaft 12, in that the bolt 21 is either threaded deeper into the tapped bore 20 or is threaded farther out of the same. In so doing the bolt 20 shifts the rod 24 axially of the latter, either towards the right or towards the left in dependence upon the direction in which the bolt 21 is turned, and this changes the position of the ring 25 with reference to the yoke 26 and coil 26 through which current flows. This in turn varies the magnetic flux or the induced current, and produces a signal which is used to control the speed of the motor 11 via the simple aforementioned electronic control device.

It should be understood that the ring 25 can itself be constructed as a current-carrying coil which influences the induced current in the coil 27.

In dependence upon the elasticity of the spring 26 or the pitch of the internal thread in the tapped bore 20 and the thread on the bolt 21, the actual rotational speed of the motor, beginning with the no-load speed, can be selected to be unchanged, to increase or decrease. In the event that the spring 16 should break, no torque will be further transmitted so that this acts as a safety arrangement.

It will be understood that each of the elements described above, or two or more together, may also find a useful application in other types of constructions differing from the types described above.

While the invention has been illustrated and described as embodied in an electric power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electric power tool with torque-dependent speed regulation, comprising an electric motor having a drive shaft; a driven output shaft; transmission means for transmitting rotary motion from said drive shaft to said driven shaft, including a gear on said drive shaft; mechanical means movable in response to change in the torque of one of said shafts, including a spring connecting said gear to said drive shaft with limited freedom of relative angular displacement, a tapped bore in said drive shaft, a bolt turnably threaded into said bore and connected with said gear for joint turning but with freedom of axial displacement, a longitudinally shiftable rod mounted for shifting in one or an opposite direction in dependence upon said displacement of said bolt; and varying means cooperating with said mechanical means for varying the speed of said electric motor in dependence on the movement of said mechanical means, including an electric winding operatively connected with said electric motor, and a body carried by said rod for displacement relative to said winding so as to originate in the latter respective signals which control the rotational speed of said electric motor.

2. A power tool as defined in claimm 1, wherein said gear has an axial extension formed with a slot; and wherein said spring has one end secured in said slot and another end secured in a recess formed in a free end of said drive shaft.

3. A power tool as defined in claim 2, wherein said bolt comprises a transverse projection which extends into said slot on said gear.

4. A power tool as defined in claim 3, wherein said gear is a pinion.

5. A power tool as defined in claim 2, wherein said spring is a helical spring and surrounds said bolt.

6. A power tool as defined in claim 3, wherein said rod is fast with said bolt and moves with the same.

7. A power tool as defined in claim 2, wherein said drive shaft is formed with an axial bore, and said rod is of synthetic plastic material and slidably received in said bore, said rod having an end portion projecting outwardly from said drive shaft and carrying said body.

8. A power tool as defined in claim 8, wherein said body is ring-shaped.

9. A power tool as defined in claim 7, wherein said winding includes a yoke, and wherein said body is located within the confines of, but is out of contact with, said yoke.

10. A power tool as defined in claim 7, wherein said body is of iron.

11. A power tool as defined in claim 7, wherein said body is a permanent magnet.

12. A power tool as defined in claim 1, wherein said body carries an electric winding.

13. A power tool as defined in claim 1, wherein said further means varying include an electric control unit connected to said winding and comprising an input transistor having an output, an amplifier connected to the output of said transistor, and a potentiometer connected to said amplifier for regulating the motor current.

* * * * *